(12) United States Patent
Niitsuma et al.

(10) Patent No.: US 10,477,850 B2
(45) Date of Patent: Nov. 19, 2019

(54) BEARING HOUSING STRUCTURE AND DUAL-BEARING REEL

(71) Applicant: Shimano Inc., Sakai, Osaka (JP)

(72) Inventors: Akira Niitsuma, Osaka (JP); Satoshi Fujii, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/211,651

(22) Filed: Dec. 6, 2018

(65) Prior Publication Data
US 2019/0200592 A1 Jul. 4, 2019

(30) Foreign Application Priority Data

Dec. 28, 2017 (JP) ................................ 2017-252957

(51) Int. Cl.
*A01K 89/01* (2006.01)
*A01K 89/015* (2006.01)
*A01K 89/00* (2006.01)

(52) U.S. Cl.
CPC .... *A01K 89/0193* (2015.05); *A01K 89/01928* (2015.05); *A01K 89/006* (2013.01); *B65H 2701/355* (2013.01)

(58) Field of Classification Search
CPC ........ A01K 89/01922; A01K 89/01923; A01K 89/0193; A01K 89/01931
See application file for complete search history.

(56) References Cited

U.S. PATENT DOCUMENTS

| | | | | |
|---|---|---|---|---|
| 5,875,986 A | * | 3/1999 | Miyazaki | A01K 89/0155 242/261 |
| 6,053,444 A | * | 4/2000 | Yamaguchi | A01K 89/0193 242/280 |
| 6,409,113 B1 | * | 6/2002 | Hirayama | A01K 89/01557 242/310 |
| 2003/0111569 A1 | * | 6/2003 | Hitomi | A01K 89/011223 242/321 |
| 2009/0080817 A1 | * | 3/2009 | Gomyo | F16C 17/08 384/121 |
| 2010/0038464 A1 | * | 2/2010 | Nakagawa | A01K 89/01931 242/321 |
| 2011/0011967 A1 | * | 1/2011 | Takechi | A01K 89/01908 242/302 |

(Continued)

FOREIGN PATENT DOCUMENTS

JP 2017-127233 A 7/2017

*Primary Examiner* — Emmanuel M Marcelo
(74) *Attorney, Agent, or Firm* — Global IP Counselors, LLP

(57) ABSTRACT

A bearing housing structure includes a bearing, a lid part and a supporting part. The bearing rotatably supports spool shaft. The lid part is opposite an end surface of the spool shaft and extends in a direction that intersects the spool shaft. The supporting part houses and supports the bearing and holds the lid part to oppose the end surface of the spool shaft. The supporting part includes a bearing hole and a lid hole, the bearing hole having the bearing inserted thereinto and removed therefrom, and the lid hole has a portion of the lid part inserted thereinto and removed therefrom in a direction intersecting the spool shaft and a direction along the lid part, and the lid part closes an opening of the bearing hole such that the lid part is held by the lid hole of the shaft supporting portion.

5 Claims, 7 Drawing Sheets

(56) References Cited

U.S. PATENT DOCUMENTS

| | | | |
|---|---|---|---|
| 2013/0233957 A1* | 9/2013 | Niitsuma | A01K 89/015 242/285 |
| 2015/0115087 A1* | 4/2015 | Ohara | F16C 32/0406 242/223 |
| 2016/0249595 A1* | 9/2016 | Haraguchi | A01K 89/0193 242/283 |

* cited by examiner

BEARING HOUSING STRUCTURE AND DUAL-BEARING REEL

CROSS-REFERENCE TO RELATED APPLICATIONS

This application claims priority to Japanese Patent Application No. 2017-252957, filed on Dec. 28, 2017. The entire disclosure of Japanese Patent Application No. 2017-252957 is hereby incorporated herein by reference.

BACKGROUND

Field of the Invention

The present invention relates to a bearing housing structure for a fishing reel and a dual-bearing reel equipped with the bearing housing structure.

Background Art

Conventional dual-bearing reels include a shaft supporting portion, which supports a spool shaft on the side opposite to a handle Generally, the handle can be removed from a reel body in order to replace the spool. A bearing that rotatably supports the spool shaft is accommodated in the shaft supporting portion. Further, in a conventional dual-bearing reel it is possible to attach/detach the bearing from the outside without removing the shaft supporting portion from the reel body in order to maintain the rotary support of the spool shaft by the bearing.

For example, in the dual-bearing reel of Japanese Published Unexamined Application No. 2017-127233, shown in FIG. 4, a through-hole through which the bearing can pass is formed such that the bearing can be inserted into and removed from the shaft supporting portion from the outside, and the opening of the through-hole is closed with a threaded cap.

In a structure in which threads are cut in the shaft supporting portion and the cap is screwed thereon, as in the dual-bearing reel of Japanese Published Unexamined Application No. 2017-127233, the strength of the threads will be insufficient if the shaft supporting portion is formed from a resin.

SUMMARY

The present invention was made to solve the problem described above, and an object thereof is to provide a fishing reel in which the bearing can be attached and detached without removing the shaft supporting portion that supports the bearing, while ensuring the strength of the shaft supporting portion.

A bearing housing structure according to a first aspect of the present invention comprises a bearing that rotatably supports a spool shaft; a lid part that is disposed opposite to an end surface of the spool shaft and that extends in a direction intersecting the spool shaft; and a shaft supporting portion that accommodates and supports the bearing and that holds the lid part to face the end surface of the spool shaft. A bearing hole, into which and from which the bearing can be inserted and removed in the spool shaft direction, and a lid hole, into which and from which at least a portion of the lid part can be inserted and removed in a direction intersecting the spool shaft and a direction in which the lid part extends, are formed on the shaft supporting portion, and the lid part closes the opening of the bearing hole in such a way that the lid part is held by the lid hole of the shaft supporting portion.

Preferably, the lid part has an arcuate portion with a diameter that is greater than or equal to an outer diameter of the bearing, and the lid part is held by the shaft supporting portion in a position in which the arcuate portion is fitted into the bearing hole.

Preferably, the lid part also includes a plate-like member, at the center of which is formed a fitting hole with a diameter that is greater than or equal to the outer diameter of the arcuate portion, as well as a contact member having the diameter of the arcuate portion and that is fitted into the fitting hole.

Preferably, or alternatively, the lid part has a plate-like member and an arcuate portion, and the arcuate portion includes an annular member made of an elastic body, on which are formed a central hole and two protrusions that sandwich the plate-like member in the lateral direction of the main surface of the plate-like member, as well as a contact member that is fitted into the hole of the annular member.

A dual-bearing reel according to a second aspect of the present invention comprises a reel body that is attached to a fishing rod, a spool that is rotatably supported by the reel body and on the outer circumference of which is wound a fishing line, a spool shaft that supports the spool at the center of rotation of the spool, and the bearing housing structure according to the first aspect of the present invention.

According to the present invention, it is possible to provide a fishing reel in which the bearing can be attached and detached without removing the shaft supporting portion that supports the bearing while ensuring the strength of the shaft supporting portion.

DETAILED DESCRIPTION OF THE EMBODIMENTS

An embodiment of the present invention will be described in detail below with reference to the drawings. Portions that are the same as or equivalent to the first embodiment have been assigned the same reference symbols.

First Embodiment

Figure 1:
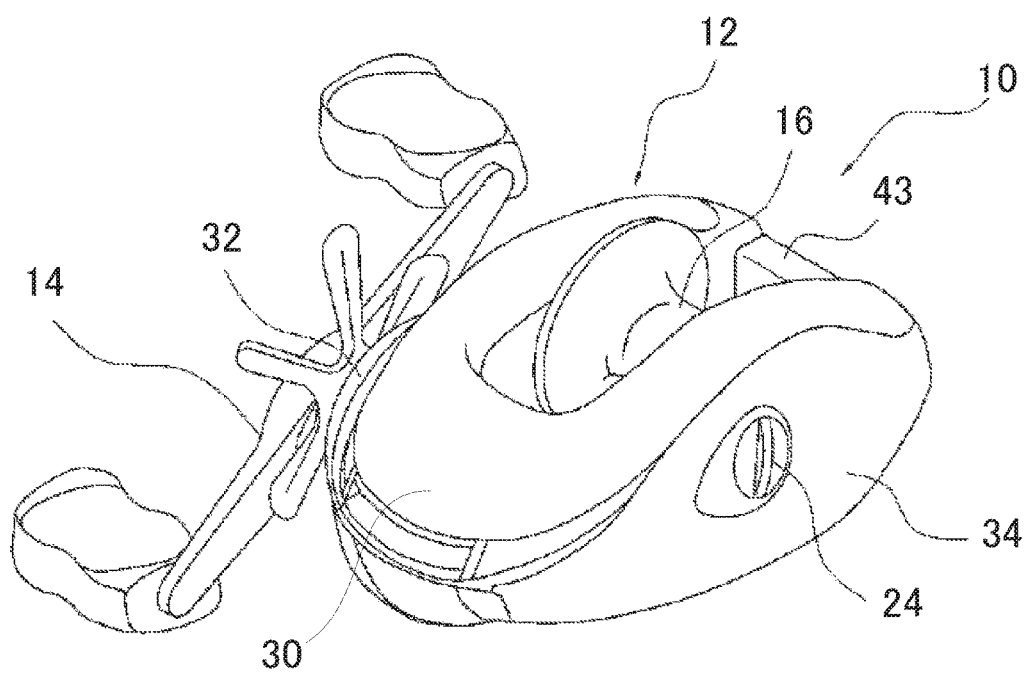
FIG. 1 is a perspective view of a dual bearing reel according to a first embodiment of the present invention.

FIG. 1 is a perspective view of a dual bearing reel according to the first embodiment of the present invention. The dual-bearing reel 10 comprises a reel body 12, a handle 14 for rotationally driving a spool that is disposed on the side of the reel body 12, and a spool 16 for winding a fishing line. The spool 16 is mounted on a spool shaft that is rotatably supported by the reel body 12.

When the transmission of the rotation of the handle 14 to the spool 16 is released and the fishing tackle that is attached to the end of the fishing line is cast, the spool 16 rotates freely and the fishing line unreels. It is possible to switch between a clutch-on state for transmitting the rotary force from the handle 14 and a clutch-off state in which the transmission is released by a clutch operating member 43 that is disposed on a rear portion of the reel body 12.

The reel body 12 comprises a frame 30, and a first side cover 32 and a second side cover 34 that are mounted on the two sides of the frame 30. The first side cover 32 is threaded onto and fixed to the handle 14 side and covers the frame 30 on the side of the handle 14. The second side cover 34 covers the frame 30 on the side opposite the handle 14. An operating member 24 for adjusting the braking force that is applied to the spool 16 is disposed in the middle of the cover 34.

A fishing line that is wound around the spool 16 is paid out in the left-front direction of FIG. 1. With respect to FIG. 1, the left-front side of the reel body 12 in FIG. 1 is referred to as the front side, and the right-rear side is referred to as the rear side.

Figure 2:
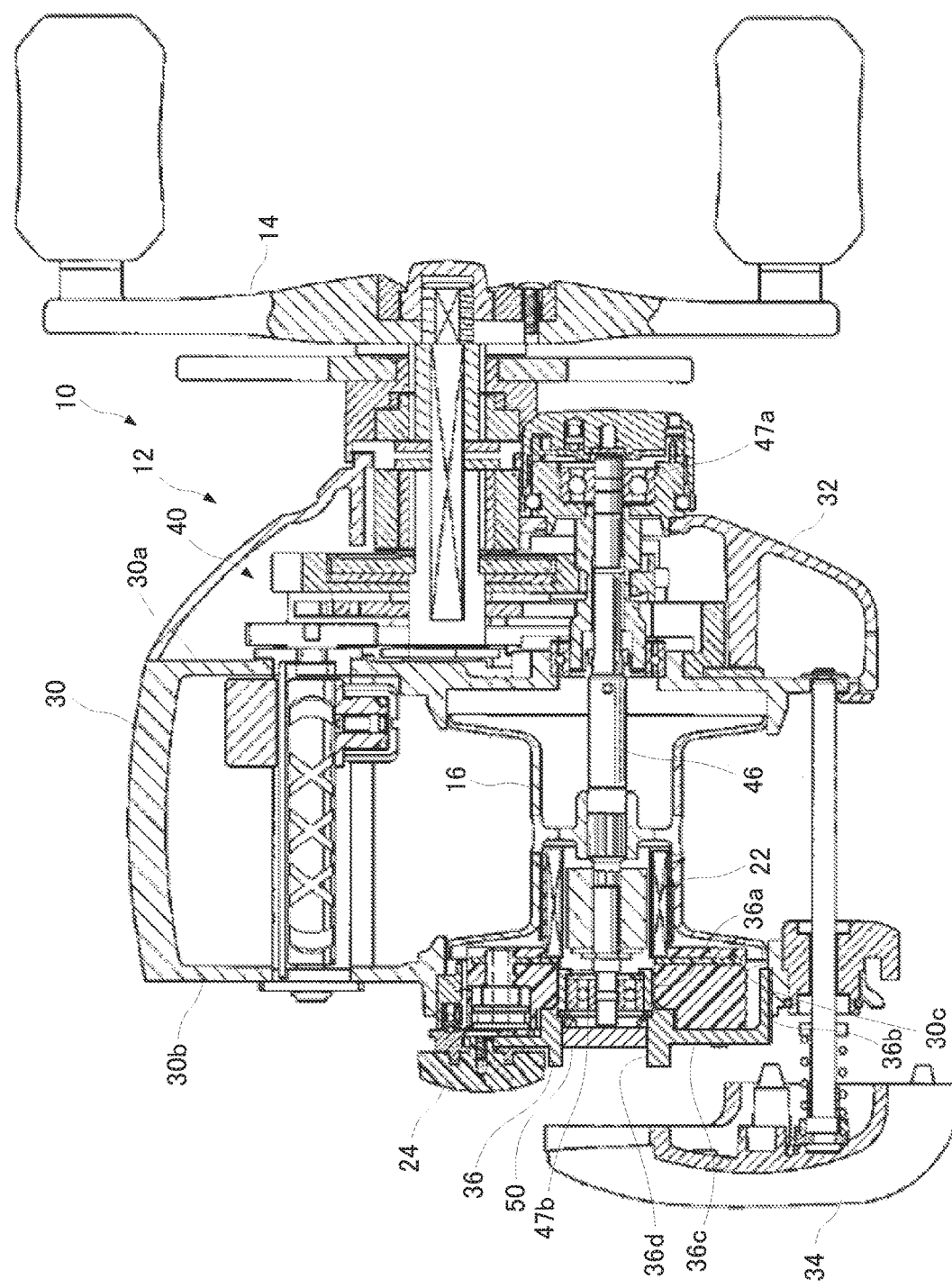
FIG. 2 is a cross-sectional view of the dual bearing reel according to the first embodiment.

FIG. 2 is a cross-sectional view of the dual bearing reel according to the first embodiment. The reel body 12 comprises a frame 30 having a first side plate 30a and a second side plate 30b, disposed opposite each other with a space therebetween, a first side cover 32 and a second side cover 34, and a supporting part 36. The first side cover 32 covers the outside of the frame 30 on the side of the first side plate 30a on the handle 14 side. The second side cover 34 covers the outside of the frame 30 on the side of the second side plate 30b. The second side cover 34 can be opened and closed. FIG. 2 shows a state in which the second side cover 34 is opened.

A drive mechanism 40 for transmitting the rotation from the handle 14 to the spool shaft is accommodated in the first side cover 32. The spool shaft 46 is arranged to pass through the first side plate 30a and the second side plate 30b, both shaft ends being respectively supported in rotatable fashion by bearings 47a, 47b. The bearing 47a on the first side plate 30a side is accommodated in the first side cover 32, and the bearing 47b on the second side plate 30b side is accommodated in the supporting part 36. The spool 16 is disposed between the first side plate 30a and the second side plate 30b and mounted on the spool shaft 46. The spool 16 rotates together with the spool shaft 46. An opening portion 30c through which the spool 16 can pass in the direction of the spool shaft 46 is formed on the second side plate 30b. The supporting part 36 is detachably connected to the opening portion 30c of the second side plate 30b.

The supporting part 36 supports the spool 16 via the bearing 47b in rotatable fashion. The supporting part 36 has the form of a flat-bottomed cylinder and is detachably connected to the second side plate 30b. The supporting part 36 has a tubular bearing housing part 36a for housing the bearing 47b, a large-diameter mounting portion 36b that is fitted into the opening portion 30c, and a stepped disc-shaped bottom portion 36c that connects the bearing housing part 36a and the mounting portion 36b. A spool braking device 22 is disposed between the mounting portion 36b and the spool 16. The spool braking device 22 is connected to the supporting part 36.

A bearing hole 36d, into and from which the bearing 47b can be inserted and removed in the direction of the spool shaft 46, is formed on the second side cover 34 side of the supporting part 36. A lid part 50, which closes the bearing hole 36d, is disposed in the supporting part 36 opposite the end surface of the spool shaft 46. The supporting part 36, the bearing 47b, and the lid part 50 constitute the bearing housing structure.

Figure 3:
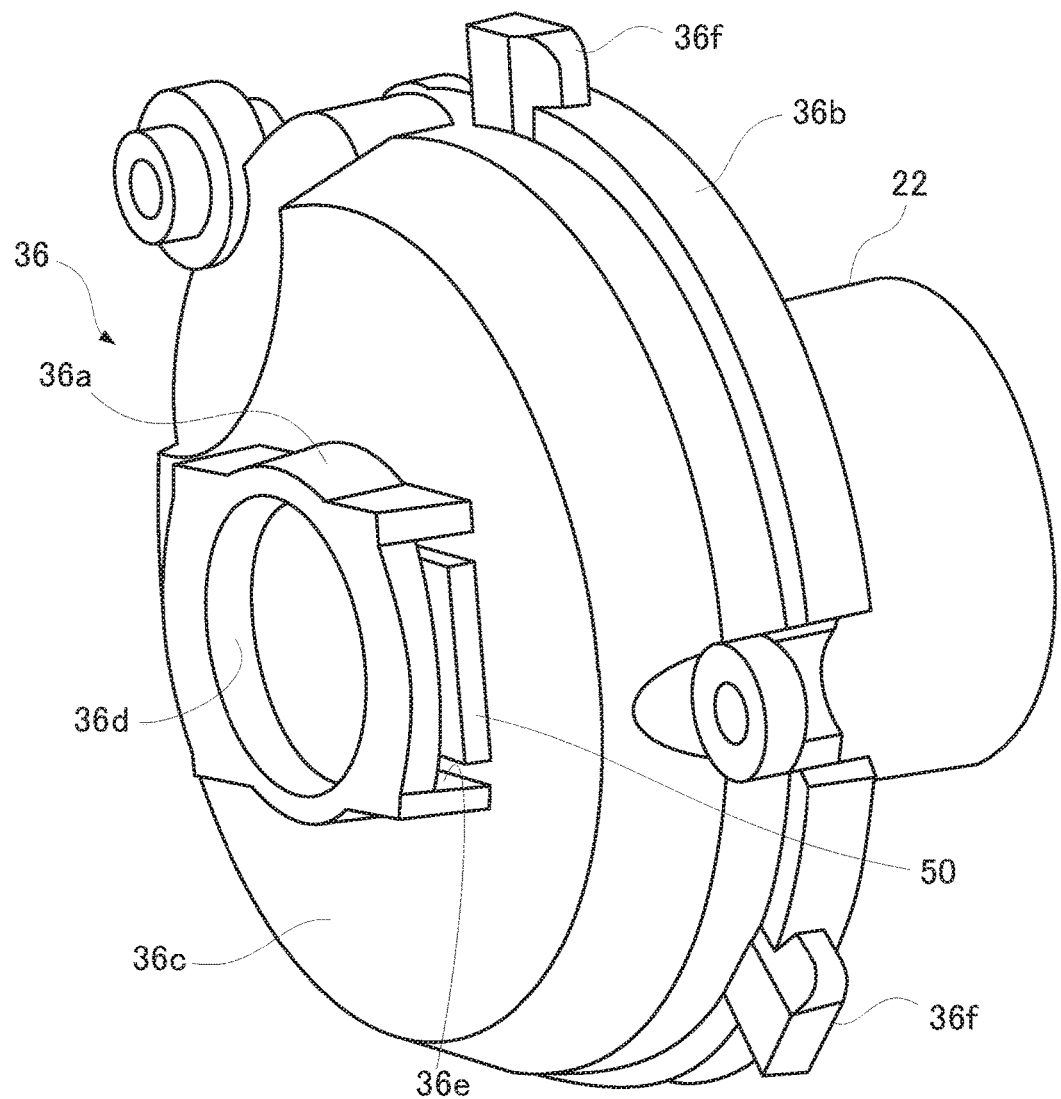
FIG. 3 is a perspective view of a bearing housing structure according to the first embodiment.

FIG. 3 is a perspective view of the bearing housing structure according to the first embodiment. FIG. 3 shows the supporting part 36, the spool braking device 22, and the lid part 50, which have been removed from the second side plate 30b. In FIG. 3, the operating member 24 has been omitted. A plurality of cam protrusions are formed at intervals on the outer periphery of the mounting portion 36b of the supporting part 36. The cam protrusions 36f engage cam receivers formed on the opening portion 30c of the second side plate 30b and connect the supporting part 36 to the second side plate 30b.

A lid hole 36e, into and from which the lid part 50 can be inserted and removed in a direction that intersects the spool shaft 46, is formed in a portion that protrudes from the bottom portion 36c of the bearing housing part 36a on the second side cover 34 side. The lid part 50 extends in a direction that intersects the spool shaft 46. The lid part 50 can be inserted into and removed from the lid hole 36e in the extending direction. The lid part 50 crosses and closes the bearing hole 36d. The movement of the lid part 50 in the spool shaft 46 direction is restrained by the lid hole 36e.

Figure 4:
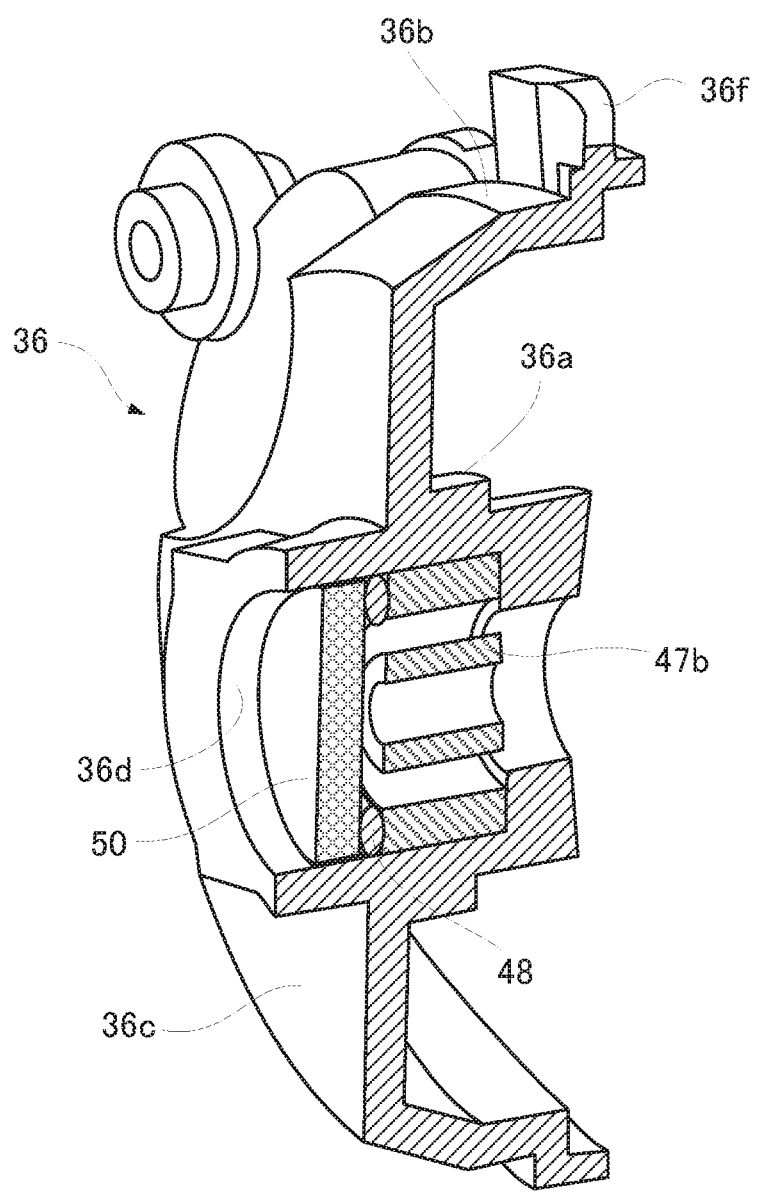
FIG. 4 is a cross-sectional perspective view of the bearing housing structure according to the first embodiment.

FIG. 4 is a perspective view of the bearing housing structure in cross section, according to the first embodiment. In FIG. 4, the spool shaft 46 and the spool braking device 22 have been omitted. The lid part 50 extends in a direction that intersects the spool shaft 46, which is inserted into an inner ring of the bearing 47b, and covers the opening of the bearing hole 36d across the bearing hole 36d. A retaining element 48 is placed between the lid part 50 and an outer ring of the bearing 47b. The retaining element 48 can be an annular spacer, an annular spring, a C-ring, or an O-ring, for example. The bearing 47b is restrained in the direction of the first side plate 30a by the bearing housing part 36a and is restrained in the direction of the second side cover 34 by the lid part 50 with the retaining element 48 interposed therebetween, and thus does not move in the spool shaft 46 direction. In addition, the lid part 50 is opposite an end surface of the spool shaft 46, not shown, and is in contact with the spool shaft 46. An arcuate portion with a diameter that is greater than or equal to the diameter of the bearing hole 36d, that is, greater than or equal to the outer diameter of the bearing 47b, is formed on the lid part 50, shown in FIG. 4, so that the central portion covers the bearing hole 36d.

Figure 5:
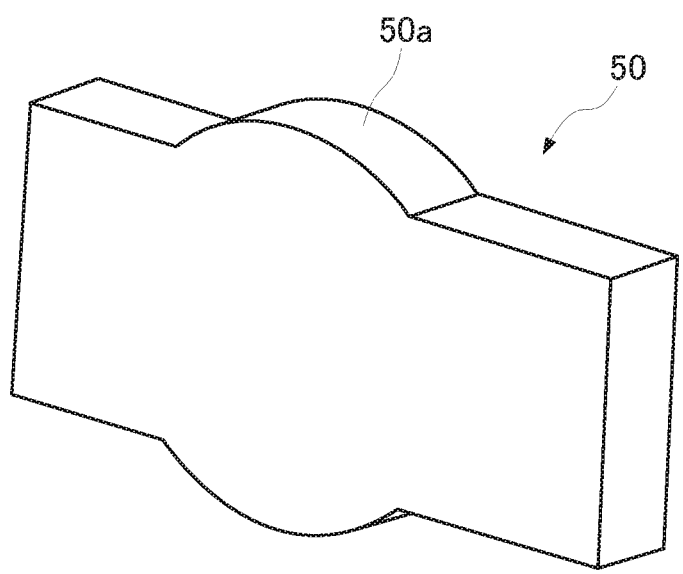
FIG. 5 is a perspective view of a lid part according to the first embodiment.

FIG. 5 is a perspective view of the lid part according to the first embodiment. As described above, the arcuate portion 50a, the diameter of which is greater than or equal to the outer diameter of the bearing 47b, is formed on the lid part 50 so as to protrude from both sides widthwise. The width of the lid hole 36e is greater than or equal to the diameter of the arcuate portion 50a, such that the arcuate portion 50a can be inserted into and removed from the lid hole 36e. The lid part 50 is held in a position in which the arcuate portion 50a covers the bearing hole 36d. For example, the width on the back side opposite the insertion port of the lid hole 36e may be less than the diameter of the arcuate portion 50a, such that the arcuate portion 50a cannot be inserted more deeply than the position that closes the bearing hole 36d. A cap, for example, is then fitted onto the portion that protrudes from the bottom portion 36c of the bearing housing part 36a on the second side cover 34 side to close the insertion port of the lid hole 36e, such that the lid part 50 does not become detached from the lid hole 36e. A retaining element for the lid part 50 may be formed on the second side cover 34 such that the lid part 50 is retained so as not to detach when the second side cover 34 is closed.

FIGS. 3 and 4 show the supporting part 36, removed from the second side plate 30b, in perspective views; because the lid hole 36e is formed farther on the second side cover 34 side than the second side plate 30b, it is possible to insert and remove the lid part 50 without removing the supporting part 36. It is therefore possible to attach and detach the bearing 47b to/from the supporting part 36 in a state in which the supporting part 36 is connected to the second side plate 30b.

According to the bearing housing structure of the first embodiment, it is possible to attach and detach the bearing 47b without removing the supporting part 36 that holds the bearing 47b. Since there is no concentration of stress, such as from fine screw threads, it is possible to guarantee the strength of the supporting part 36.

The shape of the lid part 50 is not limited to an arcuate portion 50a formed in the central region of a rectangular parallelepiped, such as that shown in FIG. 5. The lid part 50 may have any shape as long as the lid part 50 extends in a direction that intersects the spool shaft 46, closes the bearing hole 36d, and is held opposite the end surface of the spool shaft 46. For example, the lid part may be an elliptically or circularly shaped plate-like member that covers the opening of the bearing hole 36d.

Figure 6:
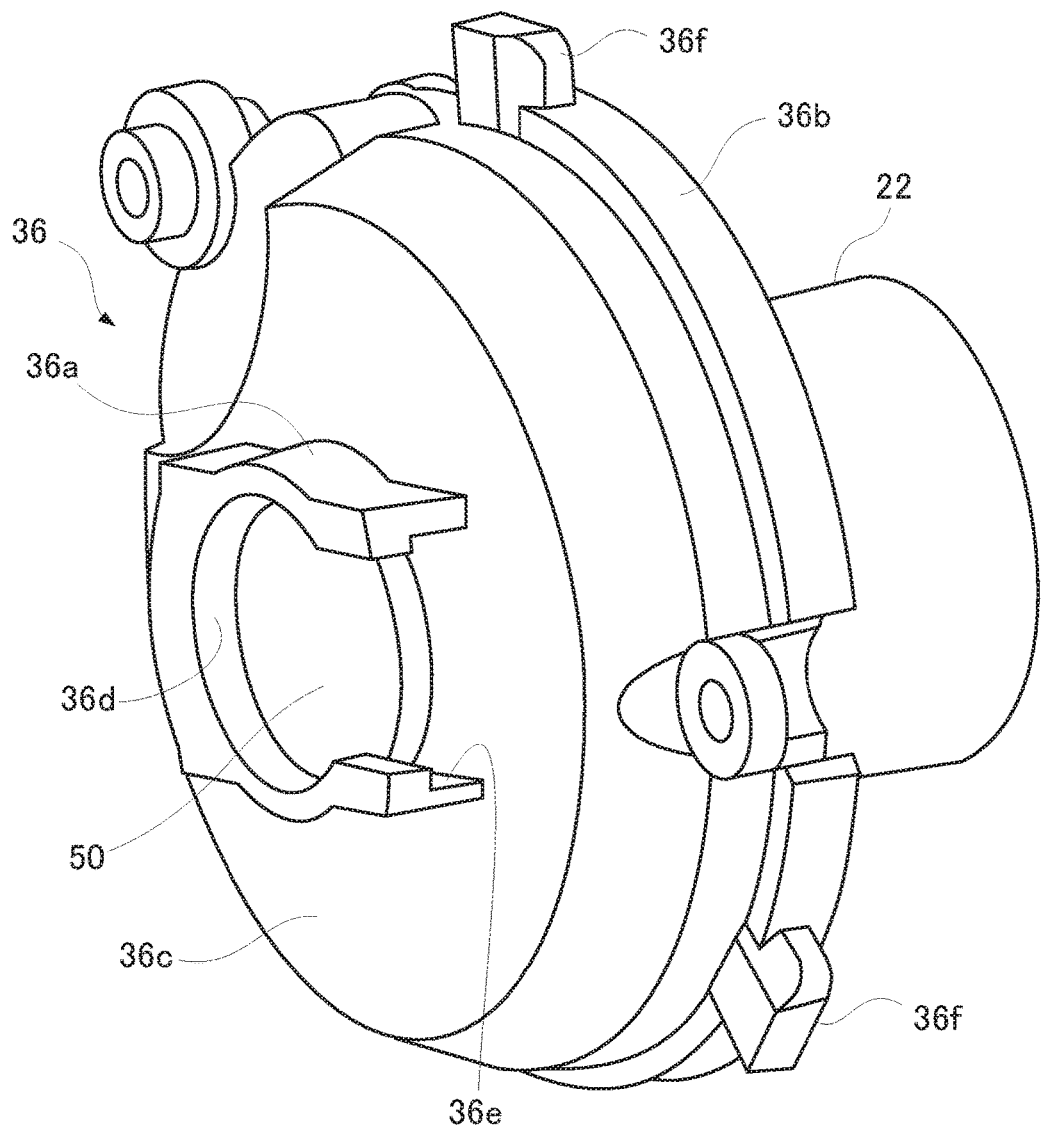
FIG. 6 is a perspective view of a modified example of the bearing housing structure according to the first embodiment.

FIG. 6 is a perspective view showing a modified example of the bearing housing structure according to the first embodiment. In the modified example of FIG. 6, the lid part 50 is a circular plate, formed, as it were, solely by the arcuate portion 50a of FIG. 5. In the example of FIG. 6, the portion opposing the bottom portion 36c of the lid hole 36e is notched to facilitate insertion and removal of the lid part 50. In the example of FIG. 6, the width of the lid hole 36e is also greater than or equal to the diameter of the lid part 50, which is a circular plate, such that the lid part 50 can be inserted into and removed from the lid hole 36e. A stepped portion or a groove, which at least partially restricts the movement of the lid part 50 in the axial direction, is formed on the inner periphery of the bearing hole 36d, and the lid part 50 is held in a position that covers the bearing hole 36d. A cap is fitted onto the protruding portion of the bearing housing part 36a so that the lid part 50 does not detach from the lid hole 36e. Alternatively, a retaining element for the lid part 50 can be formed on the second side cover 34.

The lid part 50 may be of any shape as long as the size is sufficient to cover the bearing hole 36d and to be held without becoming detached from the lid hole 36e. For example, the lid part 50 may be a rectangular plate with a width greater than the diameter of the bearing hole 36d, as long as the cap can be fitted onto the protruding portion of the bearing housing part 36a, or the retaining element for the lid part 50 is formed on the second side cover 34 such that the lid hole 36e is blocked when the second side cover 34 is closed.

Second Embodiment

Figure 7:
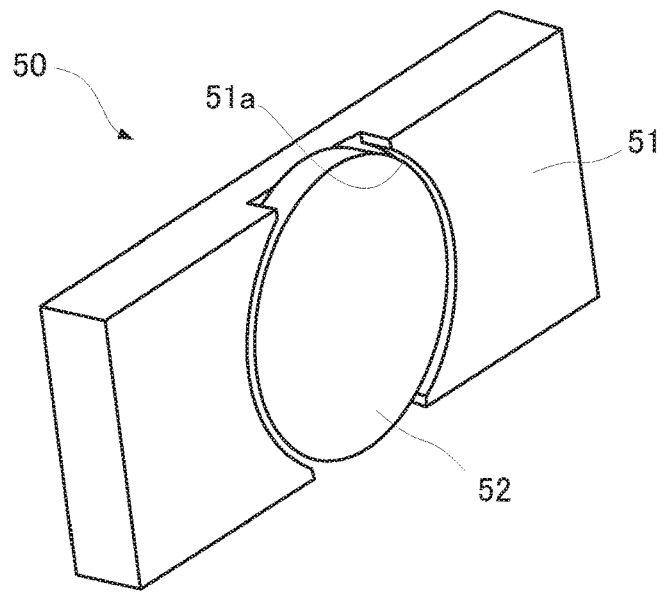
FIG. 7 is a perspective view of the lid part according to a second embodiment of the present invention.

FIG. 7 is a perspective view showing the lid part according to a second embodiment of the present invention. The lid part 50 of the second embodiment includes a plate-like member 51, in the central region of which is formed a fitting hole 51a with a diameter that is greater than or equal to the diameter of the bearing hole 36d, and a contact member 52, which is fitted in the fitting hole 51a and whose diameter is greater than or equal to that of the bearing hole 36d. In the second embodiment, the supporting part 36 is the same as the first embodiment. The lid part 50 of FIG. 7 is inserted into the lid hole 36e such that the contact member 52 opposes the end surface of the spool shaft 46. The contact member 52 contacts the spool shaft 46.

The contact member 52 may be simply fitted into the fitting hole 51a of the plate-like member 51 or be fixed to the plate-like member 51 with an adhesive, for example. The width of the lid hole 36e is greater than or equal to the diameter of the contact member 52, and the lid part 50 can be inserted and removed in a state in which the contact member 52 is fitted to the plate-like member 51. The lid part 50 is held in a position in which the contact member 52 covers the bearing hole 36d. The structure with which the lid part 50 is held to the lid hole 36e is the same as in the first embodiment. A retaining element 48 is disposed between contact member 52 and the outer ring of the bearing 47b such that the lid part 50 restrains the bearing 47b in the axial direction.

In the lid part 50 of the second embodiment, the contact member 52 can be made from a material suitable for contact with the shaft. For example, a material that will undergo little friction and wear with respect to the spool shaft 46 may be selected irrespective of the plate-like member 51.

Third Embodiment

Figure 8:
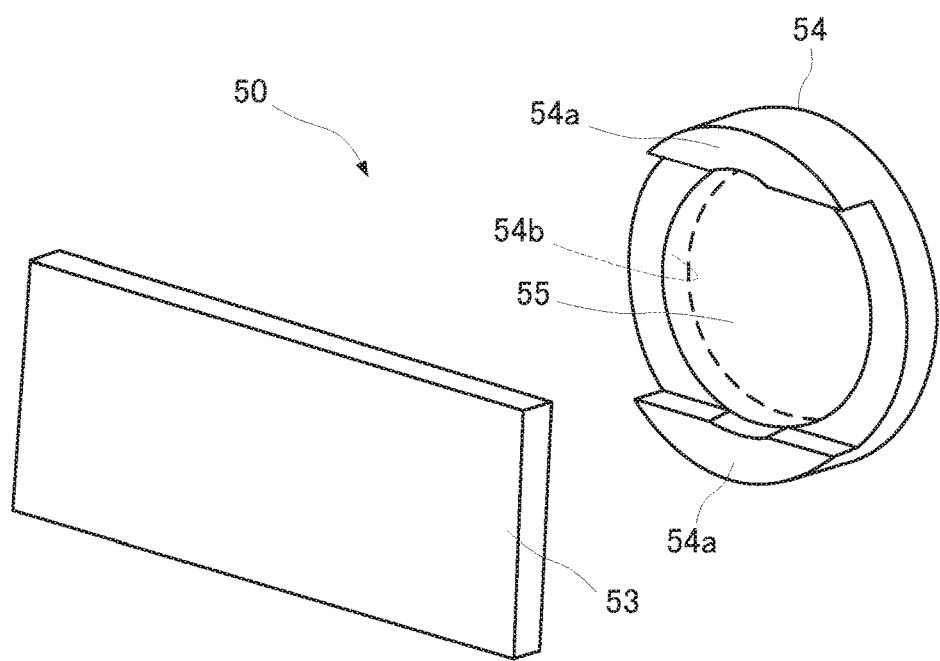
FIG. 8 is an exploded perspective view of the lid part according to a third embodiment of the present invention.

FIG. 8 is an exploded perspective view of the lid part according to a third embodiment of the present invention. The lid part 50 of the third embodiment includes a plate-like member 53, an annular member 54, and a contact member 55. The plate-like member 53 is in the form of a rectangular plate of uniform thickness. The annular member 54 is formed from an elastic body in which is formed a central hole 54b and two protrusions 54a that sandwich the plate-like member 53 from the sides of the main surface of the plate-like member 53. The contact member 55 is fitted into the hole 54b of the annular member 54.

The lid part 50 of FIG. 8 is held by the supporting part 36 in such a way that the plate-like member 53 is sandwiched between the two protrusions 54a of the annular member 54 and the contact member 55 is fitted into the hole 54b. The annular member 54 and the contact member 55 correspond to the arcuate portion. The annular member 54 is fitted into the bearing hole 36d and abuts the outer ring of the bearing 47b. The contact member 55 is in contact with the spool shaft 46. The thickness of the contact member 55 may be less than the height of the hole 54b of the annular member 54 such that the contact member 55 does not contact the inner ring of the bearing 47b.

The lid part 50 of FIG. 8 is inserted from the lid hole 36e in a state in which the plate-like member 53, the annular member 54, and the contact member 55 are combined. Alternatively, the contact member 55 is fitted to the annular member 54, in the spool shaft 46 direction from the opening of the bearing hole 36d and held, and the plate-like member 53 is inserted from the lid hole 36e. The plate-like member 53 is held in the annular member 54 by friction. Alternatively, in the same manner as in the first embodiment, the plate-like member 53 can be held by a cap that covers the lid hole 36e or by a retaining element that is formed on the second side cover 34.

The annular member not only retains the bearing 47b but also suppresses vibration of the bearing 47b, since the annular member 54 abuts the bearing 47b with an elastic body. The plate-like member 53 is a simple plate without protuberances or recesses, and thus is simply manufactured. Since the contact member 55 is a separate body, the contact member can be made from a material suitable for contact with the shaft, in the same manner as in the second embodiment.

What is claimed is:

1. A bearing housing structure, comprising:
   a bearing rotatably supporting a spool shaft;
   a lid part disposed at an end surface of the spool shaft and extending in a direction that intersects the spool shaft; and
   a supporting part housing and supporting the bearing and holding the lid part at the end surface of the spool shaft,
   the supporting part including a bearing hole and a lid hole, the bearing hole configured to have the bearing inserted thereinto and removed therefrom in a direction along the spool shaft, and the lid hole configured to have at least a portion of the lid part inserted thereinto and removed therefrom in the direction that intersects the spool shaft and a direction along which the lid part extends, and
   the lid part is configured to close an opening of the bearing hole such that the lid part is held by the lid hole of the shaft supporting portion.

2. The bearing housing structure according to claim 1, wherein
   the lid part has an arcuate portion with a diameter that is greater than or equal to an outer diameter of the bearing, and the lid part is configured to be held by the supporting part in a position in which the arcuate portion is fitted into the bearing hole.

3. The bearing housing structure according to claim 2, wherein
   the lid part further includes
   a plate-like member having a fitting hole disposed in a central region thereof, the fitting hole having a diameter greater than or equal to an outer diameter of the arcuate portion, and
   a contact member having the diameter of the arcuate portion and fitted into the fitting hole.

4. The bearing housing structure according to claim 2, wherein
   the lid part further includes
   a plate-like member and the arcuate portion, and
   the arcuate portion includes
   an annular member formed from an elastic body, the annular member having a central hole and two protrusions formed thereon, the two protrusions sandwiching the plate-like member from sides of a main surface of the plate-like member, and
   a contact member fitted into the hole of the annular member.

5. A dual bearing reel, comprising
   a reel body attached to a fishing rod;
   a spool rotatably supported by the reel body and having an outer perimeter configured to have a fishing line wound thereon;
   a spool shaft supporting the spool at a center of rotation of the spool; and
   the bearing housing structure according to claim 1.

* * * * *